W. AIKEN.
Chuck for Screw-Threading.
No. 162,137. Patented April 20, 1875.
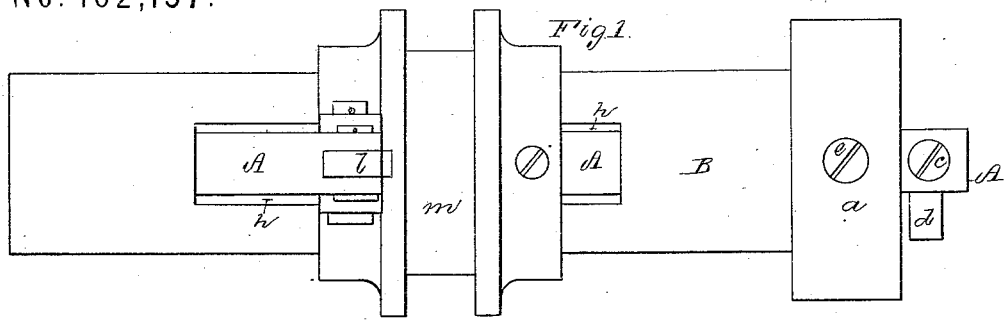
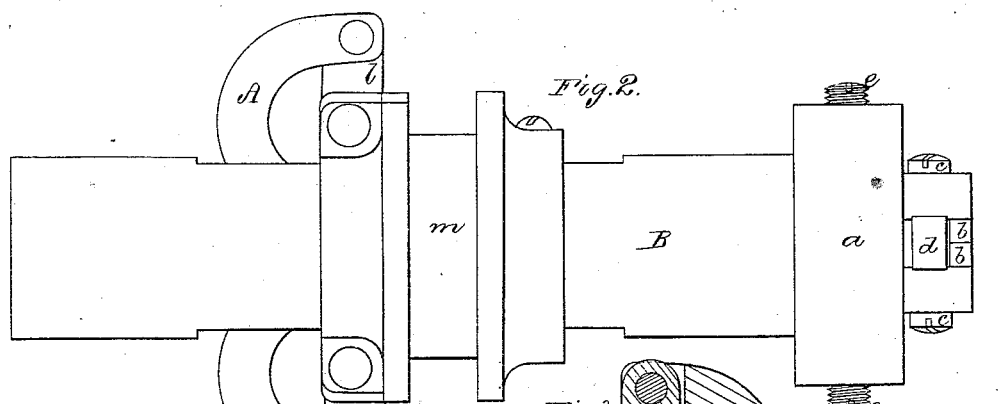
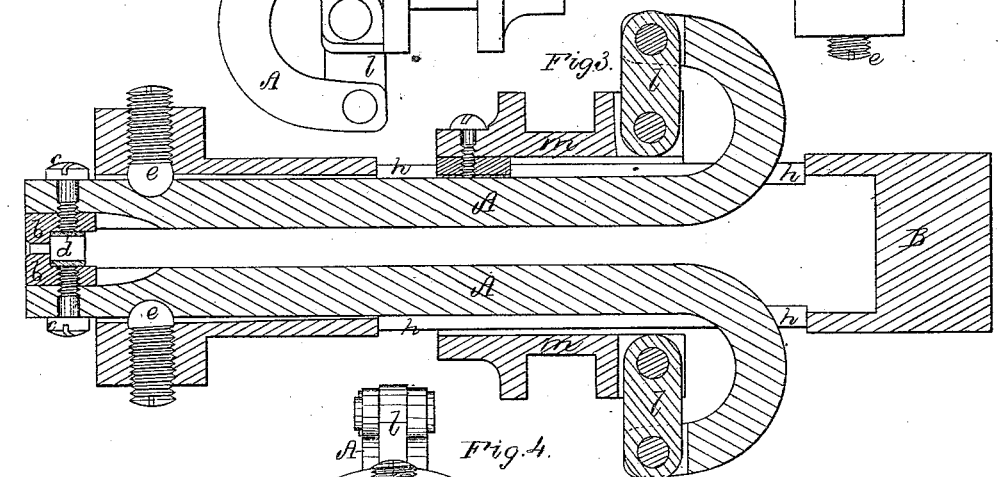
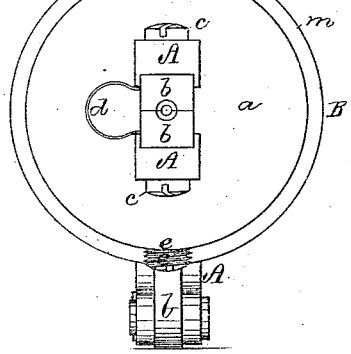
Witnesses
S. N. Piper
L. N. Höller
Walter Aiken.
by his attorney
R. H. Eddy

UNITED STATES PATENT OFFICE.

WALTER AIKEN, OF FRANKLIN, NEW HAMPSHIRE.

IMPROVEMENT IN CHUCKS FOR SCREW-THREADING.

Specification forming part of Letters Patent No. 162,137, dated April 20, 1875; application filed February 27, 1875.

*To all whom it may concern:*

Be it known that I, WALTER AIKEN, of Franklin, of the county of Merrimack and State of New Hampshire, have invented a new and useful Improvement in Screw-Blank Spindles; and do hereby declare the same to be fully described in the following specification and represented in the accompanying drawings, of which—

Figure 1 is a top view, Fig. 2 a side elevation, Fig. 3 a longitudinal section, and Fig. 4 a front end-view, of a spindle and its jaws provided with my invention.

My invention or improvement consists in each of the movable jaw-levers, bent so as to extend laterally out of the spindle, in combination with the actuating toggle and slide arranged in front of the rear end of the said lever, all as hereinafter described, and as represented.

My invention presents an excellent and practical means of operating the jaws of a spindle for holding screw-blanks.

In such drawings, A A denote two levers arranged within a hollow shaft or spindle, B. The said levers at their front ends project, as shown, out of and beyond the head $a$ of the spindle, and are provided with jaw-sockets to receive and hold two jaws, $b\ b$, fastened in the sockets by screws $c\ c$. Between the parts of the levers that so extend beyond the shaft-head is a bow-spring, $d$, for opening the jaws or pressing the levers up to their pivots. Both levers pivot upon the conical ends of two screws, $c\ c$, that are screwed into the head $a$, radially thereof, as represented. The screws thus become adjustable pivots for setting the jaws nearer or farther apart, as occasion may require, to adapt them to blanks of different sizes. The spindle has slots $h\ h$ leading laterally through it or out of its bore, in manner as shown, the jaw-levers being curved and extended through such slots and beyond the spindle, in manner as represented. The said jaw-levers, at their outer ends, are jointed to links or toggles $l\ l$, which, in turn, are pivoted to a collar, $m$, that encompasses the spindle, and is to be capable of being moved back and forth lengthwise thereon. On sliding the collar backward on the spindle the levers will be moved in a manner to close the jaws, a reverse movement of the collar causing them to open apart or move asunder.

I do not claim a pair of jawed levers, toggles, and slide arranged together and in a spindle, as shown in my Patent No. 149,626, dated April 14, 1874; nor do I claim a tubular slide and a pair of jaw-levers arranged outside of and with a spindle, in manner as shown in either of the United States Patents 6,218, 20,789.

In my spindle I gain, with the advantage of having the jaw-levers within its bore, that of being able to force the toggles into a straight line with each other, whereby the jaws can be made to gripe the screw-blank with the greatest useful effect.

I therefore claim—

In combination with the jaw-levers A A, bent and extended laterally at their rear parts out of the spindle B, substantially as represented, the tubular slide $m$ and the toggles $l\ l$, arranged with the spindle, and in advance of the bent portions of the jaw-levers, and connected together and therewith, all as set forth.

WALTER AIKEN.

Witnesses:
R. H. EDDY,
J. R. SNOW.